A. N. Merritt,
Butter Cutter.

Nº 69,690. Patented Oct. 8, 1867.

Witnesses
Theo Tusche
J. A Service.

Inventor
A. N. Merritt
Per Knmr Co.
Attorneys

United States Patent Office.

A. N. MERRITT, OF GARDNER, MASSACHUSETTS.

Letters Patent No. 69,690, dated October 8, 1867.

---

IMPROVED BUTTER-CUTTER.

---

The Schedule referred to in these Letters Patent and making part of the same.

---

TO ALL WHOM IT MAY CONCERN:

Be it known that I, A. N. MERRITT, of Gardner, in the county of Worcester, and State of Massachusetts, have invented a new and improved Butter-Cutter; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to furnish an improved instrument by means of which butter may be cut from the crock or tub in a suitable form and size for the table; and it consists in the combination of an inverted cylindrical cup, movable plate, and separating wire with each other, as herein shown and described.

Figure 1:
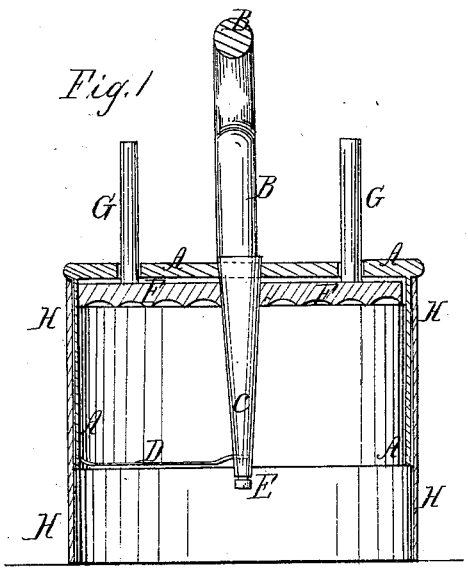
Figure 1 is a vertical section of my improved cutter.
Figure 3:
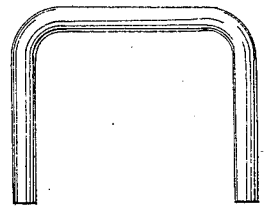
Figure 3 represents the starting pins as detached from the plate and connected at their upper ends.
Figure 2:
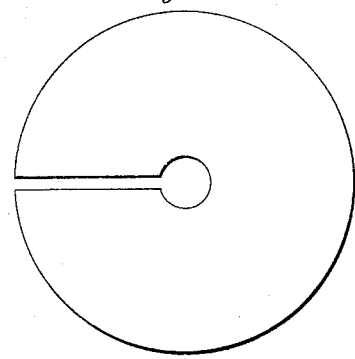
Figure 2 represents another form for the movable plate.

A is an inverted cylindrical cup, the sides of which are made so thin that they may be forced down into the solid mass of butter. The bottom of the cup should be made of such a strength as to be of sufficient stiffness to allow the handle B to be attached to it. C is a centre-pin passing down through a hole in the middle of the cup A, and to the lower end of which is attached the end of the cutting-wire D, one end of which passes through and is secured in a hole through the side of the cup A, near its lower edge, and its other end passes into a hole in the lower end of the centre-pin C, and is secured in place by the set-screw E. F is the movable plate, which is made of such a size as to fit into and move freely up and down in the cup A, and which has a hole through its centre for the passage of the centre-pin C. To the upper side of the plate F are attached two guide or starting pins G, which pass up through holes in the bottom of the cup A, as shown in fig. 1. The movable plate F may be corrugated upon its lower surface, or may have any design formed upon it which it is desired to have formed upon the cake of butter, or it may be made plain, as shown in fig. 2. If desired, the starting pins G may be made separate from the movable plate F, and their upper ends may, for convenience, be connected with a cross-bar, as shown in fig. 3. In this case the movable plate may be made with a slit from its centre hole to its outer edge, so that it may readily be inserted in and removed from the cup A, when desired. H is a hoop or stand designed to support the instrument when not in use, and also designed to support it when transferring the cake of butter from the cup A to the plate.

In using the instrument, it is forced down into the mass of butter and turned once around, the wire D cutting off the butter in the cup A smoothly and evenly from the mass. It is then lifted up and transferred to the plate and placed upon the stand H, as shown in fig. 1. Then by pushing upon the starting pins G the cake of butter will be forced out of the cup A by the movable plate F. When a plain movable plate is used, or when the instrument has not been forced down with sufficient force to imprint the design upon cake of butter, the said cake may be inverted before placing it upon the table, so as to have the surface smoothly cut by the cutting-wire D upon the top.

I claim as new, and desire to secure by Letters Patent—

The combination of the inverted cylindrical cup A, movable plate F, or its equivalent, centre-pin C, and cutting-wire D with each other, substantially as herein shown and described and for the purpose set forth.

A. N. MERRITT.

Witnesses:
L. H. SAURIS,
AUGUSTUS KNOWLTON.